Feb. 15, 1944.  C. I. MacNEIL  2,342,057
SYNCHROSCOPE
Filed Oct. 31, 1941
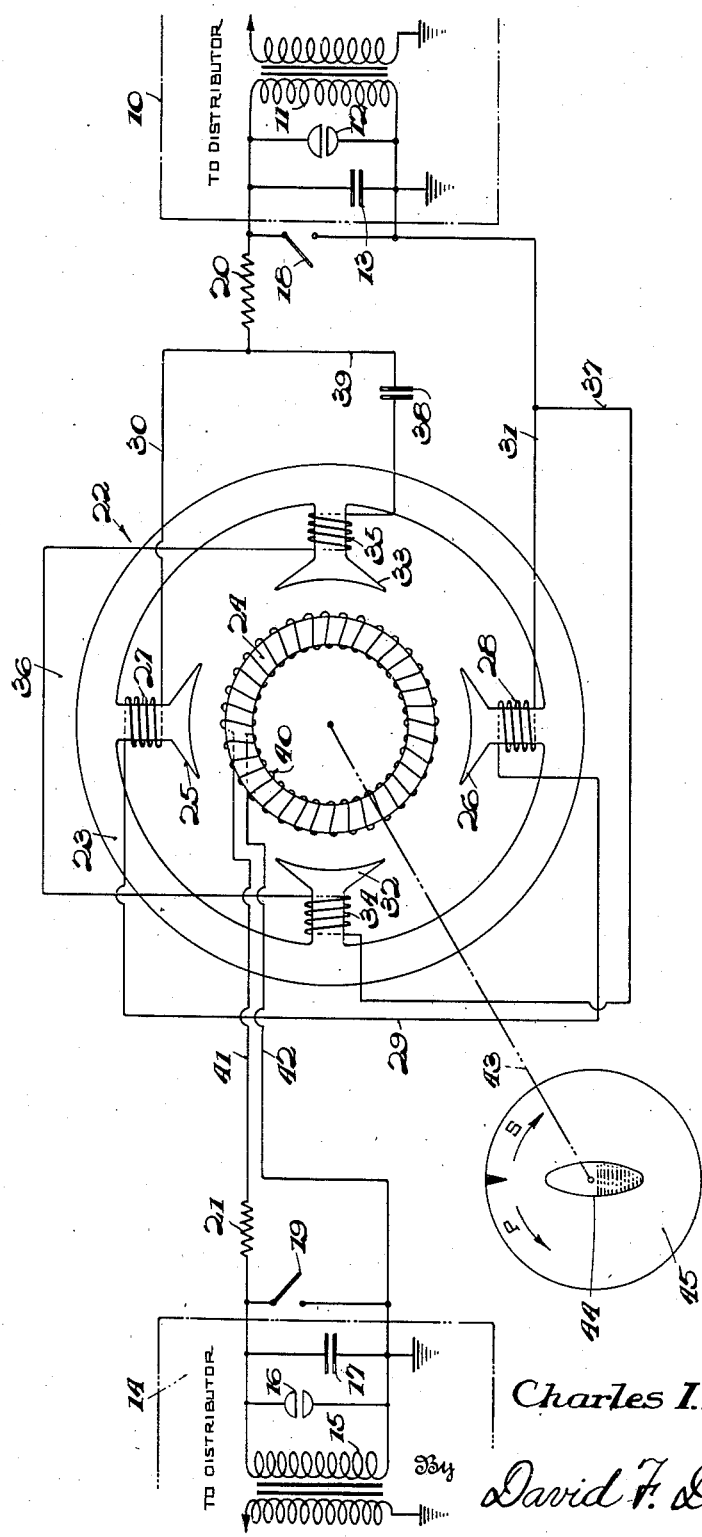
Inventor
Charles I. MacNeil.
By David F. Doody
Attorneys Patented Feb. 15, 1944

2,342,057

UNITED STATES PATENT OFFICE 2,342,057

SYNCHROSCOPE

Charles I. MacNeil, Glen Ridge, N. J., assignor to Bendix Aviation Corporation, South Bend, Ind., a corporation of Delaware Application October 31, 1941, Serial No. 417,403

4 Claims. (Cl. 177—311)

This invention relates to indicating systems, and in particular, to a device for indicating the quality of synchronization between two or more engines.

Many attempts have been made in the past to provide a satisfactory indicator of engine synchronization, particularly aircraft engine synchronization, but these attempts have lacked simplicity or dependability in operation.

It is an object of the present invention to provide an indicator of engine synchronization which employs a single motor circuit for actuating a synchronization indicator.

Other objects include the provision of a synchronizing indicator wherein existing ignition apparatus acts as a source of alternating current for operating a single indicator motor, and the provision of a motor and ignition circuit combination for obtaining indications of synchronization without the addition of differential gearing or differential motors.

Other objects will appear from a study of the following specification when made in conjunction with the attached drawing, throughout which like numerals designate like parts.

The single figure of the drawing shows a schematic diagram of one indicator circuit exemplifying the present invention.

In general, the invention comprises polyphase connections between the magneto of one engine and the polyphase wound stator of an induction motor; and a single phase connection between the magneto of the second engine and the wound rotor of the induction motor. The indicating element may be a simple pointer which is directionally responsive, to indicate whether one or the other of the two engines is revolving the faster, and which remains motionless to indicate the condition of true synchronization between the two engines.

Having reference to the drawing, 10 represents an engine-driven magneto having a conventional primary coil 11, breaker points 12 and a condenser 13. A second magneto 14 is driven by a second engine (not shown) and has a conventional primary coil 15, breaker points 16 and condenser 17. From these magnetos, the primary circuits of which have just been described, are wires leading to the pilot's compartment, where these wires are connected to conventional ignition switches 18 and 19 for controlling the operation of the engine driving magnetos 10 and 14, respectively. Current limiting resistors 20 and 21 are provided between the magneto switches and the equipment about to be described for limiting the amount of current to said equipment so as to safeguard against magneto failure, should excessive current be drawn due to some accidental reason.

An induction motor 22, having a two phase stator 23 and a wound rotor 24, is energized by the intermittent impulses of alternating current, generated in magnetos 10 and 14, the frequency of which is a function of the speed of rotation of the respective engines driving the magnetos 10 and 14. Pole members 25 and 26 carry windings 27 and 28 respectively, which are connected in series by means of conductor 29 and the terminals of coil 11 by means of conductors 30 and 31. Poles 32 and 33 carry the respective windings 34 and 35, which are connected in series by means of conductor 36 and to coil 11 and condenser 13, by means of conductor 37, phasing condenser 38, conductor 39 and resistor 20. Windings 27 and 28 together are the first phase of the two phase stator winding, while windings 34 and 35 together are the second phase of the two phase stator winding of motor 22.

The A. C. voltage generated across coil 11 is single phase, but by means of the "phase splitting" condenser 38, the voltage is split in phase so that the current and voltage in coils 34 and 35 are shifted in phase approximately 90 degrees from the current and voltage in coils 27 and 28.

The voltage across coil 15 is impressed upon the winding 40 of rotor 24 through conductors 41 and 42. Rotor 24 carries a shaft 43, to which is attached the indicating pointer or flag 44 of the synchronization indicating dial 45.

As is well known in the art, the excitation of a polyhase wound stator of an A. C. motor by suitable polyphase current will cause a revolving magnetic field to be set up in the magnetic circuit of the motor. Should this polyphase motor be equipped with a wound rotor and should the wound rotor be at rest, its conductors will be cut by the magnetic lines at a frequency equal to the frequency of the rotating field caused by the excitation of the stator. This magnetic cutting of conductors in the rotor thereby generates a voltage in said rotor, and should the conductive circuit of the rotor be closed, current will flow in said rotor, and the magnetic field of said current will react with the magnetic field of the stator and cause the rotor to revolve. This action will take place with gradual acceleration of the rotor until the rotor is revolving at a speed very nearly equal to that of the revolving field. Should the wound rotor be supplied with alternating current from an external source, then the speed of rotation of the rotor will be such as to make up the difference in frequency between that of the rotating magnetic field of the stator, and that of the physically rotating field of the rotor. Furthermore, should the rotor be supplied with a frequency equal to that of the stator, then the rotor will remain stationary in space, and should the rotor be supplied with a frequency greater than that of the stator, it will physically revolve in the opposite direction, so that the relative rotation of the two magnetic fields in relation to each other will be zero.

In view of the above explanation, in the present invention, if magneto 14 is at rest, then rotor 24 will rotate at a physical speed depending upon the frequency of the current supplied to the stator winding, which in turn depends upon the speed of magneto 10. This will cause rotation in one direction—for example, clockwise of the rotor and of the pointer attached thereto.

When magneto 14 is operating, then the rotor will be supplied with A. C. power at a frequency depending upon the speed of the engine driving the magneto 14, and if the speeds of magnetos 10 and 14 are equal, there will be no rotation of the indicator. However, should the speed of magneto 14 be greater or less than that of magneto 10, the rotor 24 will revolve counter-clockwise or clockwise at a speed equivalent to the difference in speeds of the two magnetos, and thus, indicate which engine is running the faster. Should the throttle or propeller governing means be suitably adjusted so as to have both engines, and therefore, both magnetos running at identical speeds, then the rotor 24 will remain stationary in space and accordingly, its pointer will likewise be stationary. This condition indicates synchronization of both engines, and any departure from that synchronization will be indicated by the pointer rotating in one direction or other, depending upon which engine is running the faster. The rotation of pointer 44 will be at slow speed as synchronization is lost, if the two engines under observation leave synchronization gradually, at low speed differentials.

It will thus be seen that by means of the present invention, a synchroscope is provided wherein, by completely electrical means, comprising a polyphase-wound-rotor induction motor, the point of synchronization of the engines under observation is indicated by a steady pointer 44, and the quality of synchronization—that is, the condition of one engine rotating at a speed faster than the other—is indicated by unique rotations of the same pointer 44. Further, an approximation of the difference in speed between the two engines under observation is given by the speed at which indicating pointer 44 rotates. As a result, when two engines are being brought into synchronization, as, for example, by adjusting the throttle of one of the engines, the point of near-synchronization is indicated by the slow rotation of the indicating pointer 44, and the pilot may adjust the throttle at a sufficiently slow rate to prevent excessive hunting prior to the obtaining of the synchronization between the two engines.

Dial 45 may bear the markings "P" and "S", designating, respectively, the port and starboard engines of the aircraft, and the arrows under each letter indicate direction of rotation of pointer 44 when the "P" or "S" engine is too fast for synchronization at a desired rotative speed.

Since many changes may be made to the particular device shown and described, without exceeding the scope of the invention, it is desired to limit the invention not to the form shown, but by the scope of the appended claims.

What is claimed is:

1. In combination with two engine-driven magnetos, means for indicating engine synchronization, comprising an induction motor having a two-phase stator and a wire-wound rotor, alternating current, split-phase connections between one of said magnetos and said two-phase stator, alternating current connections between the other of said magnetos and said wire-wound rotor, and an indicator driven by said rotor to show the quality of synchronization between engines.

2. In combination with two engine-driven magnetos, a device for indicating qualitatively the difference in speed of rotation between said engines, comprising an electric motor having a two-phase stator and a wound rotor, two-phase connections between one of said magnetos and said stator, single phase connections between the other of said magnetos and said wound rotor and a rotatable indicating flag connected to said rotor.

3. In combination with two engine-driven magnetos, a device for indicating the synchronization and relative rotation between said engines, comprising an electric motor having a polyphase stator and a wound rotor, an indicating flag, a driving connection between said rotor and said indicating flag, polyphase connections between said stator and one of said magnetos, and electrical connections between the other of said magnetos and said wound rotor, whereby the movement, and the direction of movement of said rotor are governed by the relative speeds of the engines driving said magnetos.

4. In a synchronization indicator for multiple engines, a first engine-driven magneto, an induction motor having a polyphase stator and a wound rotor, a second engine-driven magneto, electrical connections between said polyphase stator and the first of said magnetos, electrical connections between said wound rotor and the second of said magnetos, and an indicating member mechanically connected to said rotor for indicating synchronization and the quality of asynchronization of the engines driving said magnetos.

CHARLES I. MacNEIL.